US010237161B2

(12) United States Patent
Girmonsky

(10) Patent No.: US 10,237,161 B2
(45) Date of Patent: Mar. 19, 2019

(54) SYSTEM AND METHOD FOR DYNAMICALLY TESTING NETWORKED TARGET SYSTEMS

(71) Applicant: CA, Inc., Islandia, NY (US)

(72) Inventor: Alon Girmonsky, Tel Aviv (IL)

(73) Assignee: CA, Inc., Islandia, NY (US)

( * ) Notice: Subject to any disclaimer, the term of this patent is extended or adjusted under 35 U.S.C. 154(b) by 14 days.

(21) Appl. No.: 14/563,603

(22) Filed: Dec. 8, 2014

(65) Prior Publication Data

US 2015/0163124 A1 Jun. 11, 2015

Related U.S. Application Data

(60) Provisional application No. 61/914,417, filed on Dec. 11, 2013.

(51) Int. Cl.
*H04L 12/26* (2006.01)
*H04L 12/24* (2006.01)

(52) U.S. Cl.
CPC ............ *H04L 43/50* (2013.01); *H04L 41/142* (2013.01); *H04L 41/147* (2013.01)

(58) Field of Classification Search
CPC ...... H04L 41/142; H04L 41/147; H04L 43/50
See application file for complete search history.

(56) References Cited

U.S. PATENT DOCUMENTS 5,218,605 A 6/1993 Low et al.
6,546,513 B1 4/2003 Wilcox et al.
7,274,684 B2 9/2007 Young et al.
7,808,918 B2 10/2010 Bugenhagen
7,840,851 B2 11/2010 Hayutin
7,844,036 B2 11/2010 Gardner et al.
8,060,791 B2 11/2011 Hayutin
8,185,651 B2 5/2012 Moran et al.
8,239,831 B2 8/2012 Brennan et al.
8,306,195 B2 11/2012 Gardner et al.
8,341,462 B2 12/2012 Broda et al.
8,510,600 B2 8/2013 Broda et al.
8,553,677 B2 10/2013 Furukawa et al.
9,450,834 B2 * 9/2016 Gardner .................. H04L 41/22
2003/0110421 A1 * 6/2003 Kurinami ............ G06F 11/3428 714/47.1
2007/0076605 A1 * 4/2007 Cidon ................. H04L 12/2697 370/230
2008/0066009 A1 3/2008 Gardner et al.
2011/0066892 A1 3/2011 Gardner et al.
2012/0017165 A1 1/2012 Gardner et al.
2012/0246310 A1 9/2012 Broda et al.
(Continued)

*Primary Examiner* — June Y Sison

(74) *Attorney, Agent, or Firm* — Pillsbury Winthrop Shaw Pittman LLP

(57) ABSTRACT

A method and system for conducting performance hybrid traffic testing of a networked target system (NTS) are disclosed. The method comprises initializing at least one private cloud source (PRCS) to generate traffic within a private network security system (PRNSS); initializing at least one public cloud source (PUCS) to generate traffic outside of the PRNSS; customizing the traffic within the PRNSS and the traffic outside of the PRNSS; gathering information respective of the performance of the at least one PUCS and the at least one PRCS; and generating a performance testing report respective of the gathered information.

20 Claims, 3 Drawing Sheets

(56) References Cited

U.S. PATENT DOCUMENTS

2012/0321052 A1* 12/2012 Morrill ............ H04L 29/06027 379/32.01
2013/0097307 A1 4/2013 Vazac et al.
2013/0111257 A1 5/2013 Broda et al.
2014/0026122 A1* 1/2014 Markande ........... G06F 11/3688 717/124
2014/0033055 A1* 1/2014 Gardner .................. H04L 41/22 715/736
2014/0068335 A1* 3/2014 Bromley ................. H04L 43/50 714/32
2014/0122935 A1* 5/2014 Li ....................... G06F 11/0709 714/38.1
2015/0012964 A1* 1/2015 Xie ..................... H04L 63/0815 726/1

* cited by examiner

SYSTEM AND METHOD FOR DYNAMICALLY TESTING NETWORKED TARGET SYSTEMS

CROSS-REFERENCE TO RELATED APPLICATIONS

This application claims the benefit of U.S. Provisional Application No. 61/914,417 filed on Dec. 11, 2013, the contents of which are hereby incorporated by reference.

TECHNICAL FIELD

The present invention relates generally to testing system performance and, more particularly, to systems and methods for testing the functionality of an enterprise's system through a plurality of private cloud sources and a plurality of public cloud sources.

BACKGROUND

The worldwide web offers real-time access to large amounts of data, enabling enterprises to provide information via widely accessible electronic communications networks in the form of a variety of computer programs. Such enterprises commonly spend a great deal of time and money testing the computer programs they develop in order to ascertain such programs' levels of functionality and performance. As established in existing solutions, to test the operation of such computer programs, performance tests are performed to determine a program's behavior under both normal and anticipated peak load conditions, to troubleshoot performance problems, and to provide unit tests on a daily basis to developed modules.

Due to the complexity of many enterprises' systems, which typically include secured private cloud sources as well as public cloud sources, testing has become highly difficult to perform. Some existing solutions offer distributed systems deployed in private cloud resources in order to test the performance of an enterprise's system. Such existing solutions are usually cumbersome and not cost effective. Other existing solutions offer a bypass to the secured system. Such a bypass is extremely complex and sometimes impossible depending on the system's architecture.

It would therefore be advantageous to provide a solution that would overcome the deficiencies of the prior art by testing the performance of an enterprise's system that includes both private and public cloud sources in a cost effective manner.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all embodiments. Its sole purpose is to present some concepts of one or more embodiments in a simplified form as a prelude to the more detailed description that is presented later. For convenience, the term some embodiments may be used herein to refer to a single aspect or multiple embodiments of the disclosure.

The disclosure relates in various embodiments to a method for conducting performance testing of a networked target system (NTS). The method comprises initializing at least one private cloud source (PRCS) to generate traffic within a private network security system (PRNSS); initializing at least one public cloud source (PUCS) to generate traffic outside of the PRNSS; customizing the traffic within the PRNSS and the traffic outside of the PRNSS; gathering information respective of the performance of the at least one PUCS and the at least one PRCS; and generating a performance testing report respective of the gathered information.

The disclosure relates in various embodiments to a system for conducting performance testing of a networked target system (NTS). The system comprises a processing system; and a memory, the memory containing instructions that, when executed by the processing system, configure the system to: initialize at least one private cloud source (PRCS) to generate traffic within a private network security system (PRNSS); initialize at least one public cloud source (PUCS) to generate traffic outside of the PRNSS; customize the traffic within the PRNSS and the traffic outside of the PRNSS; gather information respective of the performance of the at least one PUCS and the at least one PRCS; and generate a performance testing report respective of the gathered information.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
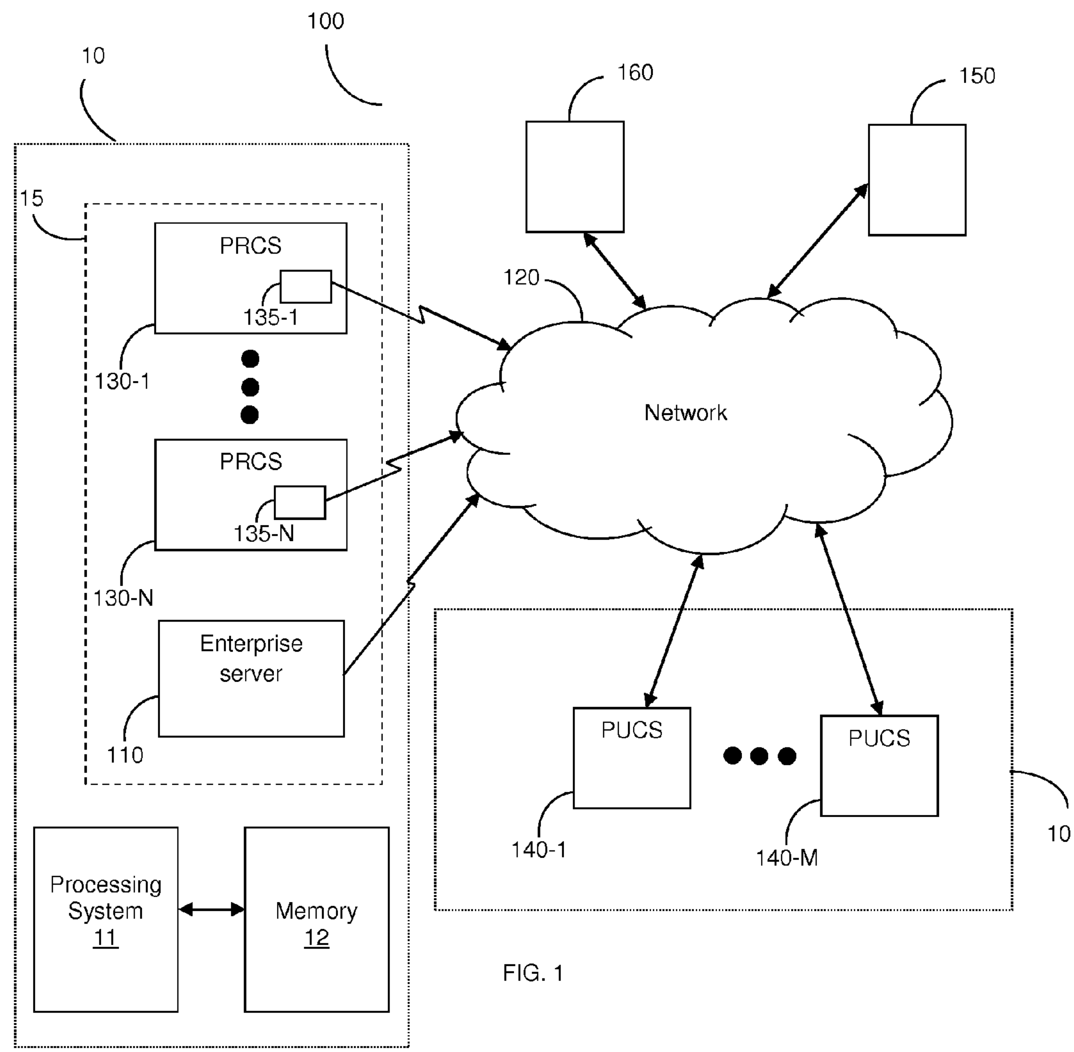
FIG. 1 is a schematic block diagram showing operation of a cloud system utilized to describe various embodiments for hybrid traffic testing.

It is important to note that the embodiments disclosed herein are only examples of the many advantageous uses of the innovative teachings herein. In general, statements made in the specification of the present application do not necessarily limit any of the various disclosed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the disclosed embodiments include a method and system for hybrid traffic testing in a hybrid cloud environment. A hybrid cloud environment is a storage system wherein some data is stored locally and other data is stored over a cloud. The system is configured to test the performance of a networked target system through a plurality of private cloud sources and a plurality of public cloud sources. In an exemplary embodiment, a plurality of agents are deployed in the private and public cloud sources, and the agents are configured to generate traffic therefrom. A FIG. 1 shows an exemplary and non-limiting block diagram illustrating a system 100 for hybrid traffic testing according to an embodiment. A networked target system (NTS) 10 includes an enterprise's server 110. The enterprise's server 110 is connected to a network 120. The NTS 10 further includes a plurality of enterprises' private cloud sources (PRCS) 130-1 through 130-N (collectively referred to hereinafter as PRCSs 130 or individually as a PRCS 130, merely for simplicity purposes) which are also communicatively connected to the network 120.

The NTS 10 typically includes a processing system 11 communicatively connected to a memory 12. In one implementation, the memory 12 contains instructions that, when executed by the processing system 11, results in the performance of the methods discussed herein below. Specifically, the processing system 11 may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 11 to perform the various functions described herein. In an embodiment, the processing system 11 may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In an embodiment, each of the PRCSs 130-1 through 130-N has an agent 135-1 through 135-N installed therein (collectively referred to hereinafter as agents 135 or individually as an agent 135, merely for simplicity purposes). The agents 135 are typically software codes that are installed in a memory of the PRCSs 130 and are executed by processing elements of such PRCSs 130. In an embodiment, an agent 135 may be realized as a network appliance connected to a respective PRCS. The network 120 may be a wireless, cellular, or wired network, a local area network (LAN), a wide area network (WAN), a metro area network (MAN), the Internet, the worldwide web (WWW), a combination thereof, and the like.

The connections of the PRCSs 130 and the enterprise's server 110 to the network 120 are secured by a private network security system (PRNSS) 15. The PRNSS 15, which may be software-based or hardware-based, controls the incoming and outgoing traffic. The NTS 10 further comprises one or more public cloud sources (PUCS) 140-1 through 140-M that are further connected to the network 120.

A performance testing server (PTS) 150 is also connected to the network 120. The PTS 150 is configured to continuously receive communications from each of the agents 135. Responsive thereto, the PTS 150 is configured to manage generation of traffic conducted by each one of the agents 135 through the NTS 10. Management of traffic generation may include, but is not limited to, customization of traffic flows. Customization of traffic is described further herein below with respect to FIG. 3. The PTS 150 is further configured to generate traffic by each of the PUCSs 140 through the NTS 10. The PTS 150 is also configured to gather information regarding performance of the NTS 10 respective of the generated traffic within the PRNSS 15, as well as information which is publically available through the PUCSs 140. Such gathered information may be provided by, e.g., PUCs 140.

The gathered information is used by the PTS 150 in order to generate a performance testing report. Generation of performance testing reports may include, but is not limited to, aggregating statistical data of the perform tests and calculating metrics respective thereof. The performance testing reports may include, but are not limited to, estimated maximum capacity, errors received during testing, throughput of the System under Test, response time, and so on. A database 160 is further connected to the network 120. Such database may be used to store information respective of the performance of the NTS 10. It should be apparent to one of ordinary skill in the art that the PTS 150 may be further configured to test the performance of a plurality of networked target systems.

As a non-limiting example, a request to test the performance of the NTS 10 is received. In this example, the enterprise server 110 sends a message regarding the test to the agents 135 over the network 120 as controlled by the PRNSS 15, thereby preparing the PRCs 130 for testing with a PUC 140 by configuring the agents 135 to communicate with the PTS 150. Responsive thereto, the PTS 150 is configured to generate traffic by each of the agents 135 and the PUC 140. The PTS 150 further gathers information related to the testing and generates a performance testing report respective thereof. The report is saved in database 160.

Figure 2:
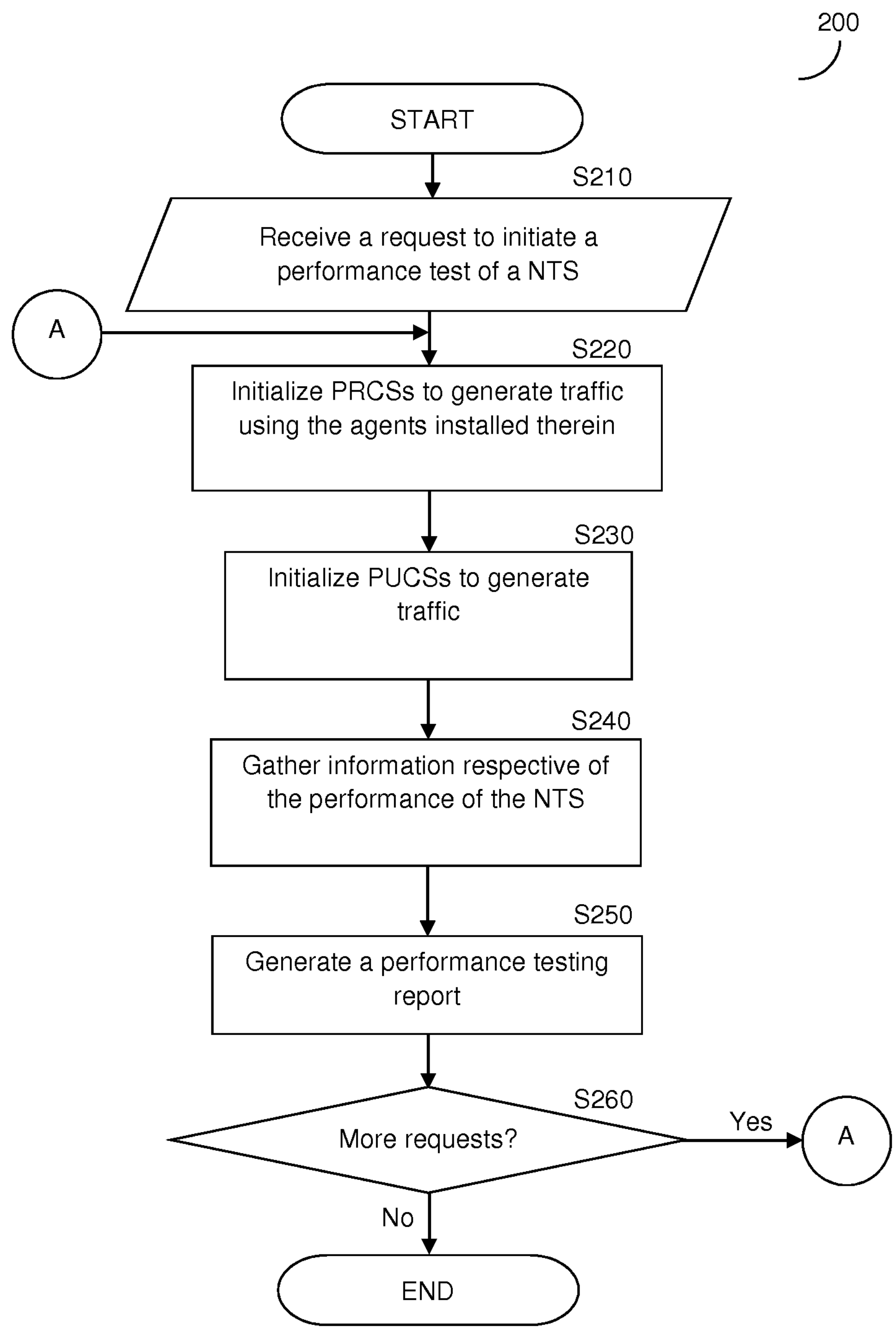
FIG. 2 is a flowchart describing a method for testing the performance of a networked target system through a plurality of private cloud sources and a plurality of public cloud sources according to an embodiment.

FIG. 2 depicts an exemplary and non-limiting flowchart 200 illustrating a method for performance testing of a networked target system in accordance with an embodiment. It should be noted that this description of the method of FIG. 2 is conducted respective of the system of FIG. 1. Other suitable systems may be used to perform the method of FIG. 2 without departing from the scope of the disclosed embodiments.

In S210, a request to initiate a performance test of at least one networked target system (e.g., the NTS 10) and metadata respective of the networked target system is received. Such received metadata may include, but is not limited to, testing parameters. Testing parameters may include, but are not limited to, the amount of traffic to be generated within the PRNSS 15, the amount of traffic to be generated outside of the PRNSS 15, which PRCSs 130 to be initialized, which PUCSs 140 to be initialized, information to be gathered during testing, and so on.

In S220, respective of the received metadata, each of a plurality of PRCSs 130 is initialized to generate traffic within the PRNSS 15. In S230, each of a plurality of PUCSs 140 is further initialized to generate traffic outside the PRNSS 15. In an embodiment, initialization is performed using the agents 135 installed within each PRCS. In an embodiment, the traffic generated within the PRNSS 15 and the traffic generated outside the PRNSS 15 may be customized. This customization may be performed to ensure, for example, that the combination of traffic meets user requirements. User requirements for generated traffic may include, but are not limited to, total volume of traffic, volume of traffic within the PRNSS 15, volume of traffic outside of the PRNSS 15, time to generate traffic, and so on. As a non-limiting example, user requirements in consumer electronics retail may be to simulate a traffic volume expected during a large sales event, such as Black Friday. Customization of traffic is described further herein below with respect to FIG. 3.

In S240, information about the performance of the NTS 10 is gathered. In various embodiments, such information may be gathered respective of the information required to complete a desired performance testing report. In an embodiment, the desired performance testing report may be indicated by, e.g., a server (e.g., the server 110). As a non-limiting example, if a desired performance testing report should include the estimated maximum capacity of the NTS, information related to respective of various amounts of traffic may be gathered.

In S250, a performance testing report is generated respective of the gathered information. The performance testing report may include, but is not limited to, estimated maximum capacity, the number and/or types of errors received during testing, throughput of the System under Test, response time, load times for particular webpages, transactions per second, and so on. In S260, it is checked whether additional requests have been received and, if so, execution continues with S220; otherwise, execution terminates.

As a non-limiting example, a request to test the performance of an NTS and metadata are received. The metadata indicates the number of PRCSs and the number of PUCSs to be initialized pursuant to testing, as well as what information to be gathered. In this example, the desired testing report should include the estimated response times as well as the number and types of errors received during testing. Based on the received metadata, the indicated numbers of PRCSs and PUCSs are initialized. During testing, information required to generate a performance testing report is gathered. In this example, such information includes the response times at various stages of testing, as well as all errors received during testing. Based on such information, a performance testing report is generated.

Figure 3:
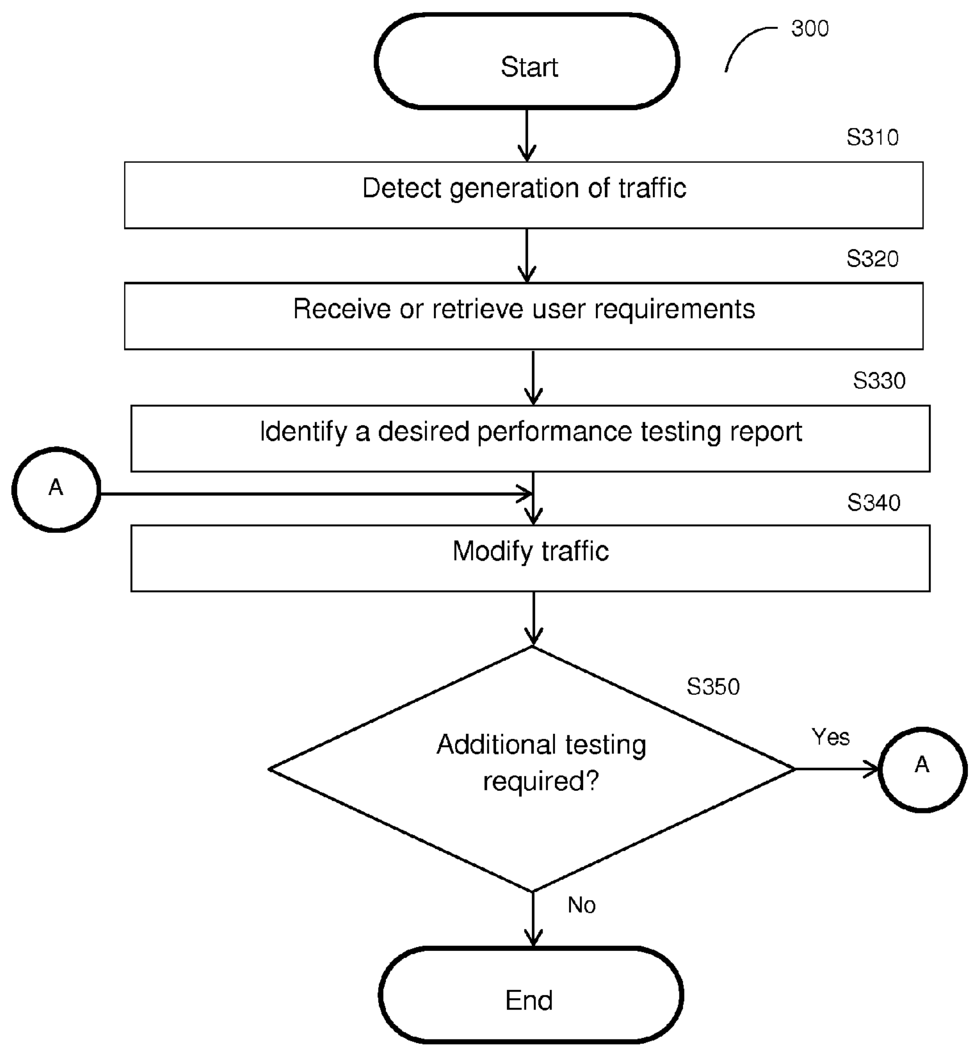
FIG. 3 is a flowchart illustrating customization of traffic according to an embodiment.

FIG. 3 is an exemplary and non-limiting flowchart 300 illustrating customization of traffic according to an embodiment. In S310, generation of traffic within a PRNSS e.g., the PRNSS 15) and outside of the PRNSS is detected. In an embodiment, S310 may further or alternatively include receiving a request to customize traffic flows. In S320, user requirements for generated traffic are received or retrieved. User requirements for generated traffic may include, but are not limited to, a maximum total volume of traffic, a maximum volume of traffic within the PRNSS, a maximum volume of traffic outside of the PRNSS, time to generate traffic, a number of traffic volume settings to test, and so on.

In S330, a desired performance testing report is identified. The desired performance testing report may include, but is not limited to, an estimated maximum capacity of a NTS, performance of the NTS at various total traffic volumes, performance of the NTS respective of constant traffic within the PRNSS and variable traffic outside of the PRNSS, and performance of the NTS respective of variable traffic within the PRNSS and constant traffic outside of the PRNSS. In S340, the detected traffic within the PRNSS and outside of the PRNSS is modified. In a non-limiting embodiment, this is performed based on the desired performance testing report and the user requirements for generated traffic. As a non-limiting example, if the user requirements include a maximum total volume of traffic and the desired performance testing report should include performance of the NTS at various total volumes, the traffic flows within and outside of the PRNSS may be modified so that traffic is equal to a total volume of traffic that is less than or equal to the maximum total volume of traffic.

In S350, it is determined whether an additional performance testing is required and, if so, execution returns to S340; otherwise, execution terminates. In an embodiment, additional performance testing may be required if, e.g., the user requirements include a number of traffic volume settings to test and the actual number of traffic volume settings tested is less than the number of traffic volume settings to test.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for conducting performance testing of a networked target system (NTS), comprising:

initializing at least one private cloud source (PRCS) to generate traffic within a private network security system (PRNSS), wherein the traffic is generated by at least one agents co-located within the at least one private cloud source, and wherein the traffic generated by the at least one agent applies a first portion of a performance-testing load to a networked target system (NTS) for which performance under the performance-testing load is being tested;

initializing at least one public cloud source (PUCS) to generate traffic outside of the PRNSS, wherein the traffic generated outside of the PRNSS contributes a second portion of the performance-testing load applied to the NTS during testing;

customizing the traffic within the PRNSS and the traffic outside of the PRNSS, wherein customizing comprises:

determining that a combination of the first portion of the performance-testing load and the second portion of the performance testing load meets a user-specified traffic-volume requirement;

gathering information respective of the performance of the NTS under load from the at least one PUCS and the at least one PRCS, wherein the NTS includes both the PUCS and the PRCS; and generating a performance testing report respective of the gathered information by aggregating statistical data of the gathered information and calculating metrics respective thereof.

2. The method of claim 1, wherein the gathered information comprises at least statistical data respective of the performance of the at least one PUCS and the at least one PRCS.

3. The method of claim 2, further comprising:

aggregating the statistical data; and calculating at least one performance testing metric based on the aggregated statistical data.

4. The method of claim 3, wherein the at least one performance testing metric is one any of: an estimated maximum capacity, at least one error received during testing, a throughput of a system under test, or a response time.

5. The method of claim 1, further comprising:

receiving at least one testing parameter respective of the NTS.

6. The method of claim 5, wherein the at least one testing parameter is any one of: an amount of traffic to be generated within the PRNSS, an amount of traffic to be generated outside of the PRNSS, or information to be gathered during testing.

7. The method of claim 6, wherein customizing the traffic within the PRNSS and the traffic outside of the PRNSS is at least based on the testing parameter.

8. The method of claim 1, wherein customizing the traffic within the PRNSS and the traffic outside of the PRNSS is based on at least a user requirement.

9. The method of claim 8, wherein the user requirement is any two of: a total volume of traffic, a volume of traffic within the PRNSS, a volume of traffic outside of the PRNSS, or a time to generate traffic.

10. A non-transitory computer readable medium having stored thereon instructions configured to cause, when executed, one or more processing units to execute operations comprising:

initializing at least one private cloud source (PRCS) to generate traffic within a private network security system (PRNSS), wherein the traffic is generated by at least one agent co-located within the at least one private cloud source, and wherein the traffic generated by the at least one agent applies a first portion of a performance-testing load to a networked target system (NTS) for which performance under the performance-testing load is being tested;

initializing at least one public cloud source (PUCS) to generate traffic outside of the PRNSS, wherein the traffic generated outside of the PRNSS contributes a second portion of the performance-testing load applied to the NTS during testing;

customizing the traffic within the PRNSS and the traffic outside of the PRNSS, wherein customizing comprises:

determining that a combination of the first portion of the performance-testing load and the second portion of the performance testing load meets a user-specified traffic-volume requirement;

gathering information respective of performance of the NTS under load from the at least one PUCS and the at least one PRCS; and generating a performance testing report by calculating metrics respective of the gathered information.

11. A system for conducting performance testing of a networked target system (NTS), comprising:

one or more processors and instructions stored in one or more memories, the instructions being configured to provide, when executed by the one or more processors, a processing sub-system configured to perform operations comprising:

initialize at least one private cloud source (PRCS) to generate traffic within a private network security system (PRNSS), wherein the traffic is generated by at least one agents co-located within the at least one private cloud source, and wherein the traffic generated by the at least one agent applies a first portion of a performance-testing load to a networked target system (NTS) for which performance under the performance-testing load is being tested;

initialize at least one public cloud source (PUCS) to generate traffic outside of the PRNSS, wherein the traffic generated outside of the PRNSS contributes a second portion of the performance-testing load applied to the NTS during testing;

customize the traffic within the PRNSS and the traffic outside of the PRNSS, wherein customizing comprises:

determining that a combination of the first portion of the performance-testing load and the second portion of the performance testing load meets a user-specified traffic-volume require;

gather information respective of performance of the NTS under load from the at least one PUCS and the at least one PRCS, wherein the NTS includes both the PUCS and the PRCS; and generate a performance testing report respective of the gathered information by aggregating statistical data of the gathered information and calculating metrics respective thereof.

12. The system of claim 11, wherein the gathered information comprises at least statistical data respective of the performance of the at least one PUCS and the at least one PRCS.

13. The system of claim 12, wherein the system is further configured to:

aggregate the statistical data; and calculate at least one performance testing metric based on the aggregated statistical data.

14. The system of claim 11, wherein the at least one performance testing metric is any of: an estimated maximum capacity, at least one error received during testing, a throughput of a system under test, or a response time.

15. The system of claim 11, wherein the system is further configured to:

receive at least one testing parameter respective of the NTS.

16. The system of claim 15, wherein the at least one testing parameter is any of: an amount of traffic to be generated within the PRNSS, an amount of traffic to be generated outside of the PRNSS, or information to be gathered during testing.

17. The system of claim 16, wherein the customization of the traffic within the PRNSS and the traffic outside of the PRNSS is based on at least the testing parameter.

18. The system of claim 11, wherein customization of traffic within the PRNSS and the traffic outside of the PRNSS is based on at least a user requirement.

19. The system of claim 18, wherein the user requirement is any three of: a total volume of traffic, a volume of traffic within the PRNSS, a volume of traffic outside of the PRNSS, or a time to generate traffic.

20. The method of claim 1, wherein:

customizing the traffic within the PRNSS and the traffic outside of the PRNSS comprises determining that the first portion of the performance-testing load is less than a user-specified maximum volume of traffic within the PRNSS and determining that the second portion of the performance-testing load is less than a user-specified maximum volume of traffic outside of the PRNSS;

performance of the NTS is tested under different conditions corresponding to different combined traffic volumes by modifying the first portion of performance-testing load or the second portion of the performance-testing load;

the calculated metrics include metrics based on response times, load times for webpages, and transactions per second; and the traffic within the PRNSS and the traffic outside of the PRNSS are customized by a performance testing server external to the PRNSS and the PUCS;

the at least one PCRCS includes a plurality of PRCSs;

the at least one agent includes a plurality of agents; and the plurality of agents are configured to communicate with the performance testing server external to the PRNSS by messages from an enterprise server within the PRNSS.

* * * * *